United States Patent [19]
Lucius

[11] 3,755,954
[45] Sept. 4, 1973

[54] FISH HOOK
[76] Inventor: Harold D. Lucius, P.O. Box 222, Industry, Pa. 15052
[22] Filed: Aug. 25, 1971
[21] Appl. No.: 174,689

[52] U.S. Cl. ............................................. 43/43.16
[51] Int. Cl. ........................................... A01k 83/00
[58] Field of Search ............................. 43/43.16, 5

[56] References Cited
UNITED STATES PATENTS
802,445  10/1905  Evans................................. 43/43.16
2,506,349  5/1950  Day............................. 43/43.16 UX Primary Examiner—Russell R. Kinsey
Assistant Examiner—Daniel J. Leach
Attorney—William J. Ruano

[57] ABSTRACT

A fish hook in which the hook portion is pivotally and yieldably connected to the shank portion and has a leaf spring secured at one end to the shank portion. The free end of the spring engages the hook portion to yieldably maintain the hook in normally upwardly extending position. When the hook accidentally engages an obstacle in the water, such as the underside of a log, it will pivot about its connection to the shank against the holding action of the spring so as to facilitate easy withdrawal from the log.

4 Claims, 6 Drawing Figures

PATENTED SEP 4 1973 3,755,954
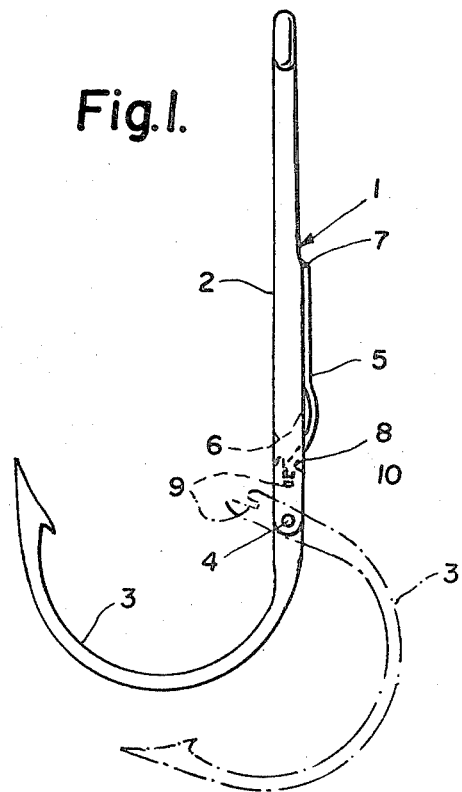
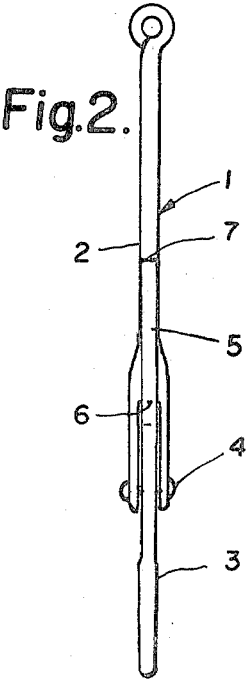
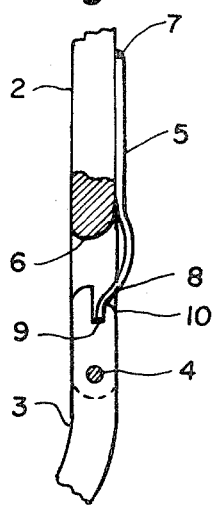
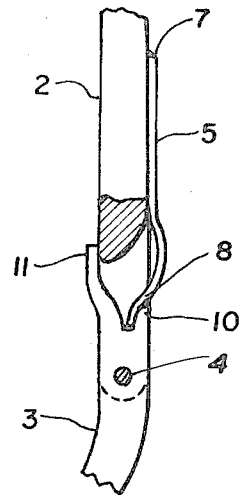
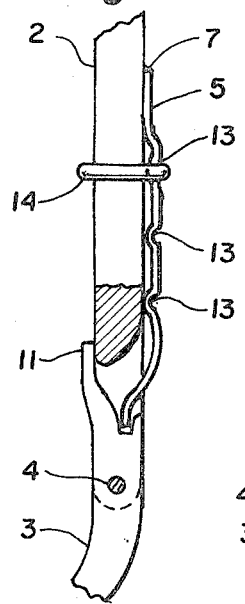
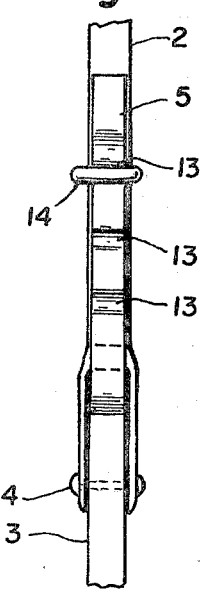
INVENTOR.
HAROLD D. LUCIUS
BY William J. Ruano
his ATTORNEY

FISH HOOK This invention relates to a fish hook and, more particularly, to a fish hook construction which will minimize or prevent snagging of the hook and "hang ups" from underwater obstacles, such as logs.

An outstanding disadvantage of commonly used fish hooks of ordinary size, wherein the hook portion and shank portion are integral, is that when the hook portion is accidentally snagged into an obstacle under the water surface, such as the bottom of a log, the hook will become lodged firmly into the log and even excessive pulling will fail to dislodge the hook, thus necessitating cutting of the line and losing the hook, but, more important, causing loss of valuable time by the fisherman which can be ill afforded if the fish happen to be running or biting at that particular moment.

An object of my invention is to provide a novel fish hook construction whereby the hook portion will pivotally yield relative to the shank portion in the event of accidental lodging thereof in underwater objects so as to make it easy to withdraw the hook from such objects.

Other objects and advantages will become more apparent from a study of the following description, taken with the accompanying drawing wherein:

FIG. 1 is a side, elevational view of a fish hook embodying the principles of the present invention and wherein the portion shown in dot and dash outline represents the hook portion after snagging;

FIG. 2 is a rear view thereof as viewed from the right of FIG. 1;

FIG. 3 is an enlarged, fragmentary, side view, partly in cross-section, illustrating the yieldable connection between the hook and shank portions;

FIG. 4 is a view similar to FIG. 3 of a modification of the yieldable connection;

FIG. 5 is an enlarged, fragmentary side view, partly in cross-section, of a further modification for adjusting the leaf spring tension; and, FIG. 6 is a rear view as viewed from the right of FIG. 5.

Referring more particularly to FIGS. 1 and 2 of the drawing, numeral 1 generally denotes a fish hook, such as those of small size for catching relatively small or medium size fish. The fish hook 1 comprises a shank portion 2 and a pivotal hook portion 3. The hook portion 3 is pivotally movable about a pin 4 from the full line position in FIG. 1 to the dash and dot line position. Normally the hook portion 3 is yieldably held in the full line position by a leaf spring 5 having one end 7 soldered, welded or otherwise attached to shank portion 2, and having a curved free end 8 which is seated in a groove 9 formed in the upper end portion 10 of the hook portion 3. Groove 9 confronts the bridge portion 6 of a bifurcated end portion of shank portion 2, shown more clearly in FIG. 2.

In operation, therefore, if while fishing, hook portion 3 should become accidentally lodged into an object under the water surface, such as the bottom of a log, upward pulling movement of shank portion 2 by the rod merely lodges the hook more firmly to provide a "hang up." However, in accordance with the present invention, the line connected to the hook is grasped and pulled upwardly directly, rather than by pulling on the rod which is flexible, so as to obtain greater pulling power without breaking the fishing rod. As will appear more clearly in FIG. 3, continued upward pull of shank portion 2 by upward direct pull of the line will cause hook portion 3 to pivot about pin 4 as a center, resisted by the tension of leaf spring 5. After a predetermined pull, the seated end 8 of the leaf spring will no longer be able to yieldably hold the hook in its normal position, whereupon, the top portion 10 of the hook portion 3 will push counterclockwise against the lower end of the leaf spring 5 until the leaf spring becomes unseated from groove 9 and assumes the dash and dot position shown in FIG. 1. After the hook has pivoted to such position, it will be readily easy to pull the hook out of the log and prevent a "hang up," since the upward pulling of shank portion 2 no longer effects a vertically upward penetrating force by the hook. Instead, hook portion 3 is easily dislodged from the log. The fisherman then pulls the hook out of water and snaps the hook portion 2 back into the position shown in full lines in FIGS. 1, 2 and 3.

It will be noted that ordinary biting by the fish of the hook portion will be insufficient to cause pivotal movement to the position shown in dash and dot outline since the biting force is insufficient and in the wrong direction to cause such movement.

FIG. 4 shows a modification very similar to FIG. 3 except that the hook portion terminates in a stop portion 11 which engages the shaded side of shank portion 2 so as to assure against pivotal movement of hook portion 3 in the wrong direction.

FIGS. 5 and 6 show a further modification which is similar to FIG. 4 except that leaf spring 5 is so constructed that its effective length can be adjustably varied simply by sliding a ring portion 14 into selective slots or grooves 13 spaced vertically of the leaf spring 5. If desired, the slots or grooves 13 may be omitted and, instead, the leaf spring 5 may be straight, as shown in FIG. 4, except that it will be attached to shank portion 2 only at its upper end, as in FIG. 5, so that the ring 14 may be vertically slid to any vertical height, as the result of a tight fit, so as to selectively vary the effective length of the leaf spring 5, namely, the distance below ring 14. This will vary the amount of tension provided by the leaf spring in resisting counterclockwise movement of hook portion 3.

Thus it will be seen that I have provided an efficient fish hook that will not "hang up" when accidentally lodging into a foreign object in the water but which will, instead, be readily disengaged therefrom by merely grasping the line and pulling upwardly, whereby losing of fish hooks by cutting of the line is eliminated as well as the delay incident in obtaining a new hook, which sometimes is highly disadvantageous when fish are biting.

While I have illustrated and described several embodiments of my invention, it will be understood that these are by way of illustration only and that various changes and modifications may be contemplated within the scope of the following claims.

I claim:

1. A fishhook comprising a straight shank portion and a curved hook portion turnably mounted on said shank portion and terminating in a hook which will move from a vertically upwardly extending position to a lower and laterally outwardly extending position upon a predetermined loading of said hook portion, said shank portion being provided with a pivot pin for pivotally mounting said hook portion thereon, a spring for yieldably maintaining said hook portion so that said hook is in normally upwardly extending position, said spring being a leaf spring having a top end secured to said shank portion and wherein the top end of said hook portion is provided with a groove for normally seating the bottom end of said spring.

2. A fish hook as recited in claim 1 wherein said hook portion has a stop extension on its upper end to abut against the bottom portion of said shank portion to prevent turning of the hook portion towards the shank portion.

3. A fish hook as recited in claim 1 wherein said spring has only its top end connected to the side of said shank portion, together with vertically slidable means for adjusting the effective free length of said spring and its tensional resistance to pivotal movement of said hook portion relative to said shank portion.

4. A fish hook as recited in claim 3 wherein said leaf spring has vertically spaced notched portions and wherein said adjusting means comprises a loop slidably and tightly fitting about said leaf spring so as to become selectively seated in said notched portions.

* * * * *